United States Patent
Wada et al.

(10) Patent No.: US 10,415,668 B2
(45) Date of Patent: Sep. 17, 2019

(54) POWER TRANSMISSION DEVICE

(71) Applicant: EXEDY Corporation, Neyagawa-shi, Osaka (JP)

(72) Inventors: Tomohiro Wada, Neyagawa (JP); Yuki Kawahara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 148 days.

(21) Appl. No.: 15/535,990

(22) PCT Filed: Nov. 27, 2015

(86) PCT No.: PCT/JP2015/083337
§ 371 (c)(1),
(2) Date: Jun. 14, 2017

(87) PCT Pub. No.: WO2016/111097
PCT Pub. Date: Jul. 14, 2016

(65) Prior Publication Data
US 2017/0350470 A1    Dec. 7, 2017

(30) Foreign Application Priority Data

Jan. 6, 2015 (JP) .................. 2015-000650

(51) Int. Cl.
*F16F 15/14* (2006.01)
*F16F 15/134* (2006.01)
(Continued)

(52) U.S. Cl.
CPC ........ *F16F 15/14* (2013.01); *F16F 15/12346* (2013.01); *F16F 15/12353* (2013.01);
(Continued)

(58) Field of Classification Search
None
See application file for complete search history.

(56) References Cited

U.S. PATENT DOCUMENTS

| 9,051,977 B2 | 6/2015 | Kawahara et al. |
| 2003/0173175 A1 | 9/2003 | Tomiyama |

(Continued)

FOREIGN PATENT DOCUMENTS

| CN | 103492760 A | 1/2014 |
| CN | 105209793 A | 12/2015 |

(Continued)

OTHER PUBLICATIONS

International Search Report dated Mar. 1, 2016 for corresponding foreign Application No. PCT/JP2015/083337, 2 pages.
(Continued)

*Primary Examiner* — Timothy Hannon
(74) *Attorney, Agent, or Firm* — United IP Counselors, LLC (57) ABSTRACT

A lock-up device includes an input-side rotary member, an output-side rotary member, an outer peripheral side torsion spring, a restriction member and a float member. The restriction member is attached to the output-side rotary member. The restriction member includes a first restriction part. The first restriction part is disposed at an interval from the output-side rotary member in an axial direction. The float member is rotatable relatively to the input-side rotary member and the output-side rotary member. An inner peripheral end of the float member is disposed between the output-side rotary member and the first restriction part in the axial direction.

14 Claims, 11 Drawing Sheets

(51) Int. Cl.
*F16H 45/02* (2006.01)
*F16F 15/123* (2006.01)

(52) U.S. Cl.
CPC ........ *F16F 15/134* (2013.01); *F16F 15/1421* (2013.01); *F16H 45/02* (2013.01); *F16H 2045/0205* (2013.01); *F16H 2045/0263* (2013.01); *F16H 2045/0278* (2013.01)

(56) References Cited

U.S. PATENT DOCUMENTS

| | | | | |
|---|---|---|---|---|
| 2011/0031083 | A1* | 2/2011 | Matsuoka | F16H 45/02 192/3.29 |
| 2011/0099992 | A1* | 5/2011 | Magerkurth | F16F 15/145 60/435 |
| 2013/0206529 | A1* | 8/2013 | Tomiyama | F16H 45/02 192/3.28 |

FOREIGN PATENT DOCUMENTS

| | | |
|---|---|---|
| DE | 10311333 A1 | 10/2003 |
| DE | 112012001892 T5 | 1/2014 |
| JP | 2003269573 A | 9/2003 |
| JP | 2006009918 A | 1/2006 |
| JP | 2012077820 A | 4/2012 |
| JP | 2012237441 A | 12/2012 |
| JP | 5192583 B2 | 5/2013 |
| JP | 2014206184 A | 10/2014 |
| JP | 2015014363 A | 1/2015 |
| JP | 2016-003685 A | 1/2016 |
| KR | 1020140022028 A | 2/2014 |
| WO | 2012147404 A1 | 11/2012 |
| WO | 2014196340 A1 | 12/2014 |

OTHER PUBLICATIONS

2nd Office Action of the corresponding Japanese patent application No. 2015-000650, dated Nov. 6, 2018, 2pp.

* cited by examiner

POWER TRANSMISSION DEVICE

CROSS-REFERENCE TO RELATED APPLICATIONS

This application is the U.S. National Phase of PCT International Application No. PCT/JP2015/083337, filed on Nov. 27, 2015. That application claims priority to Japanese Patent Application No. 2015-000650, filed Jan. 6, 2015. The contents of both applications are herein incorporated by reference in their entirety.

BACKGROUND

Technical Field

The present disclosure relates to a power transmission device.

Background Art

In general, a torque converter includes a lock-up device that directly transmits a torque from a front cover to a turbine. For example, in a lock-up device described in Japan Patent No. 5192583, an input plate and an output plate are elastically coupled through torsion springs. The torsion springs are restricted from moving in a radial direction and an axial direction by an intermediate member attached to the input plate.

BRIEF SUMMARY

Incidentally, it is preferable for the lock-up device to reduce a rotational fluctuation value of an output-side rotary member in order to enhance vibration attenuation performance thereof. In view of this, it is an object of the present disclosure to reduce the rotational fluctuation value of the output-side rotary member.

A power transmission device according to an aspect of the present disclosure transmits a power from an engine to a transmission. The power transmission device includes an input-side rotary member, an output-side rotary member, a first elastic member, a restriction member and a float member. The input-side rotary member is a member into which the power from the engine is inputted. The output-side rotary member outputs the power to the transmission. The first elastic member couples the input-side rotary member and the output-side rotary member such that the input-side rotary member and the output-side rotary member are rotatable relatively to each other. The restriction member is attached to the output-side rotary member. The restriction member includes a first restriction part. The first restriction part is disposed at an interval from the output-side rotary member in an axial direction. The float member is rotatable relatively to the input-side rotary member and the output-side rotary member. An inner peripheral end of the float member is disposed between the output-side rotary member and the first restriction part in the axial direction.

According to this configuration, the first restriction part is disposed at an interval from the output-side rotary member in the axial direction. Additionally, the inner peripheral end of the float member is disposed between the output-side rotary member and the first restriction part in the axial direction. Therefore, axial movement of the float member can be restricted. Additionally, the restriction member is attached to the output-side rotary member. Therefore, the inertia amount of the output-side rotary member increases by the amount of the restriction member, and a rotational fluctuation value of the output-side rotary member can be reduced. As a result, the power transmission device is enhanced in vibration attenuation performance.

The float member may include a support part disposed radially outside the first elastic member. According to this configuration, the first elastic member can be restricted from moving radially outside by the support part of the float member.

The restriction member may further include a second restriction part. The second restriction part extends from the first restriction part toward the output-side rotary member. An inner peripheral surface of the float member is opposed to the second restriction part. According to this configuration, the float member can be restricted from axially moving by the second restriction part.

The float member may include a disc part including an opening in a middle thereof and a tubular part extending from an inner peripheral end of the disc part in the axial direction. Additionally, an inner peripheral surface of the tubular part makes contact with an outer peripheral surface of the second restriction part. According to this configuration, pressure per unit area can be reduced between the float member and the second restriction part.

The restriction member may further include an attachment part. The attachment part extends radially inside from the second restriction part and is attached to the output-side rotary member. The first restriction part extends radially outside from the second restriction part.

The float member may make contact with the output-side rotary member in the axial direction. According to this configuration, the float member can be restricted from moving toward the output-side rotary member by the output-side rotary member.

The float member may not make contact with circumferential ends of the first elastic member.

The first elastic member may be a coil spring.

The first elastic member may be an arc spring.

The output-side rotary member may include a second elastic member and an intermediate member. The second elastic member is disposed radially inside the first elastic member. The intermediate member couples the first elastic member and the second elastic member in series.

The restriction member may be attached to the intermediate member.

The intermediate member may include a first intermediate plate and a second intermediate plate. The first intermediate plate couples the first elastic member and the second elastic member in series. The second intermediate plate is unitarily rotated with the first intermediate plate. The output-side rotary member further includes an output plate. The output plate is disposed between the first intermediate plate and the second intermediate plate. The output plate outputs a power from the second elastic member.

The restriction member may be fixed to one of the first intermediate plate and the second intermediate plate by a rivet. Each of the output plate and the other of the first intermediate plate and the second intermediate plate includes a through hole in a part thereof opposed to the rivet in the axial direction. According to this configuration, the rivet can be swaged through the respective through holes.

The second elastic member may be one of a plurality of second elastic members installed. The output-side rotary member further includes a coupling plate. The coupling plate couples at least two of the plurality of second elastic members in series. The coupling plate is disposed at least either between the first intermediate plate and the output plate or between the second intermediate plate and the output plate.

The power transmission device may further include a dynamic damper device. The dynamic damper device includes an inertia member that is rotatable relatively to the float member. The dynamic damper device is attached to the float member.

In this device, a power inputted into the input-side rotary member is transmitted to the output-side rotary member through the first elastic member. At this time, fluctuations in velocity of rotation to be transmitted to the transmission side by the actuation of the first elastic member are inhibited. When the first elastic member is herein actuated, the float member slides against the first elastic member. Therefore, the float member is configured to be rotated together with the first elastic member. To cope with the movement of the float member, the inertia member of the damper device acts in a direction to inhibit rotational fluctuations, whereby fluctuations in rotational velocity are more inhibited.

The dynamic damper device including the inertia member is herein attached to the float member freely rotating with respect to the first elastic member. In other words, the float member is not engaged with the first elastic member. Therefore, resonance of the dynamic damper device, used to occur in a well-known device, does not occur, and fluctuations in rotational velocity can be more inhibited especially in a low rotational speed range.

Additionally, the first elastic member and the float member are rotatable relatively to each other. Hence, a hysteresis torque becomes smaller than in the well-known device, and a damper function is more effectively exerted than in the well-known device.

According to the present disclosure, the rotational fluctuation value of the output-side rotary member can be reduced.

DETAILED DESCRIPTION OF EMBODIMENTS

Figure 1:
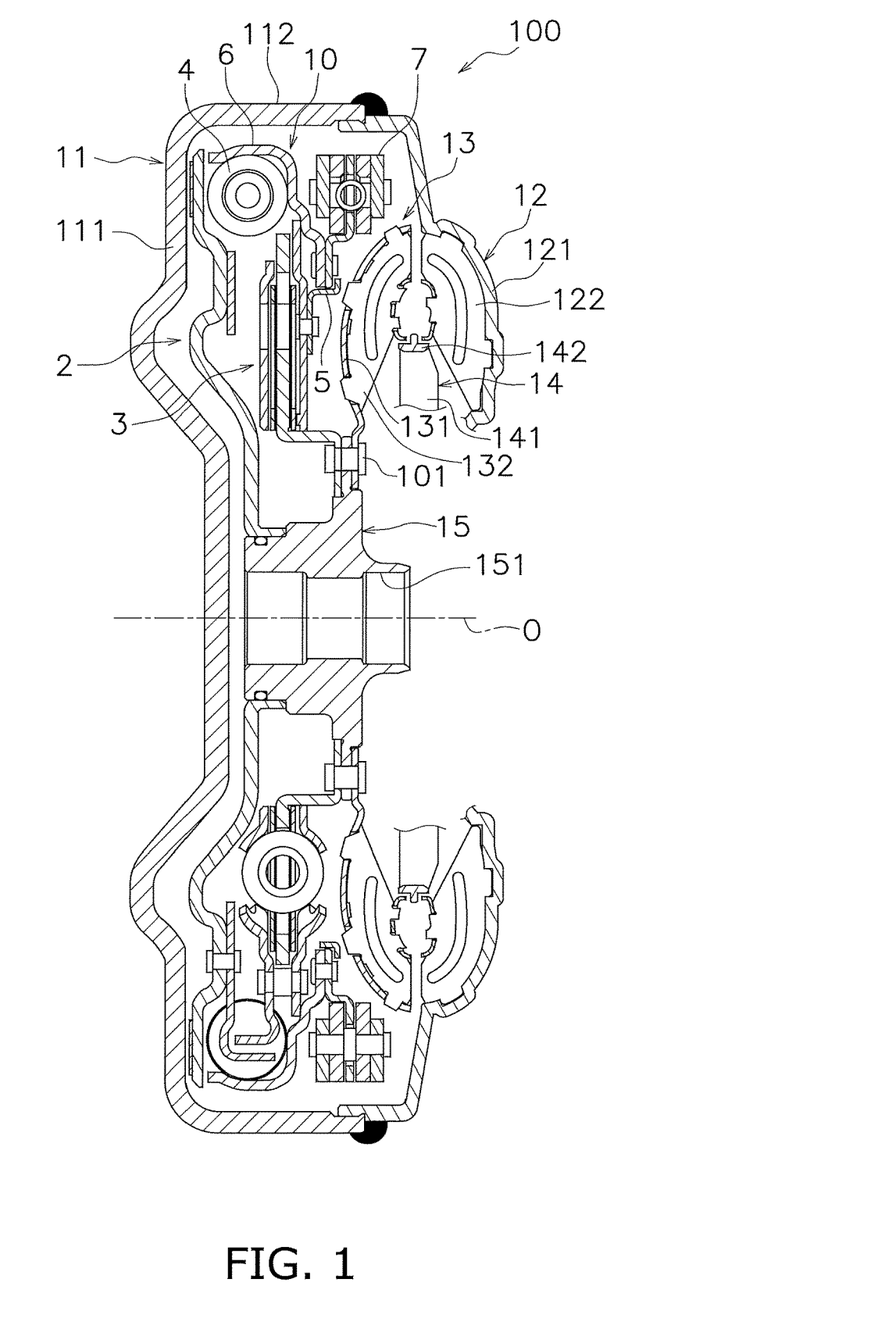
FIG. 1 is a cross-sectional side view of a torque converter.

A lock-up device, which is an exemplary embodiment of a power transmission device according to the present disclosure, will be hereinafter explained with reference to drawings. FIG. 1 is a cross-sectional view of a torque converter to which the lock-up device of the present exemplary embodiment is attached. It should be noted that in the following explanation, the term "axial direction" means an extending direction of a rotational axis O of the lock-up device. Specifically, the axial direction is a right-and-left direction in FIG. 1. The term "radial direction" means a radial direction of an imaginary circle about the rotational axis O of the torque converter. The term "circumferential direction" indicates a circumferential direction of the imaginary circle about the rotational axis O of the torque converter.

As shown in FIG. 1, a torque converter 100 includes a lock-up device 10, a front cover 11, an impeller 12, a turbine 13, a stator 14 and an output hub 15. It should be noted that an engine is disposed on the left side of the torque converter 100 whereas a transmission is disposed on the right side of the torque converter 100, although the engine and the transmission are not shown in FIG. 1.

The front cover 11 is a member into which a torque from the engine is inputted. When described in detail, the front cover 11 includes a disc part 111 and a tubular part 112. The tubular part 112 extends from an outer peripheral end of the disc part 111 toward the transmission.

The impeller 12 includes an impeller shell 121 and a plurality of impeller blades 122. The impeller shell 121 is fixed to the front cover 11. Detailedly, the impeller shell 121 is welded to the front cover 11. The impeller blades 122 are attached to the impeller shell 121.

The turbine 13 includes a turbine shell 131 and a plurality of turbine blades 132. The turbine 13 is disposed in opposition to the impeller 12. The turbine blades 132 are attached to the turbine shell 131.

The stator 14 is a mechanism disposed between the impeller 12 and the turbine 13 so as to regulate the flow of hydraulic oil returning from the turbine 13 to the impeller 12. The stator 14 includes a stator carrier 141 and a stator blade 142. The stator carrier 141 is supported by a stationary shaft through a one-way clutch. The stator blade 142 is attached to the outer peripheral surface of the stator carrier 141.

The output hub 15 is unitarily rotated with the turbine 13. Detailedly, the turbine 13 is fixed to the output hub 15 by a plurality of rivets 101. The output hub 15 includes a hole part 151. An output shaft (not shown in the drawings) is fitted to the hole part 151 of the output hub 15. Detailedly, the output shaft is spline-coupled to the hole part 151 of the output hub 15.

The lock-up device 10 is a type of power transmission device that transmits a power from the engine to the transmission. The lock-up device 10 includes an input-side rotary member 2, an output-side rotary member 3, a plurality of outer peripheral side torsion springs 4 (exemplary first elastic members), a restriction member 5, a float member 6 and a dynamic damper device 7.

Figure 2:
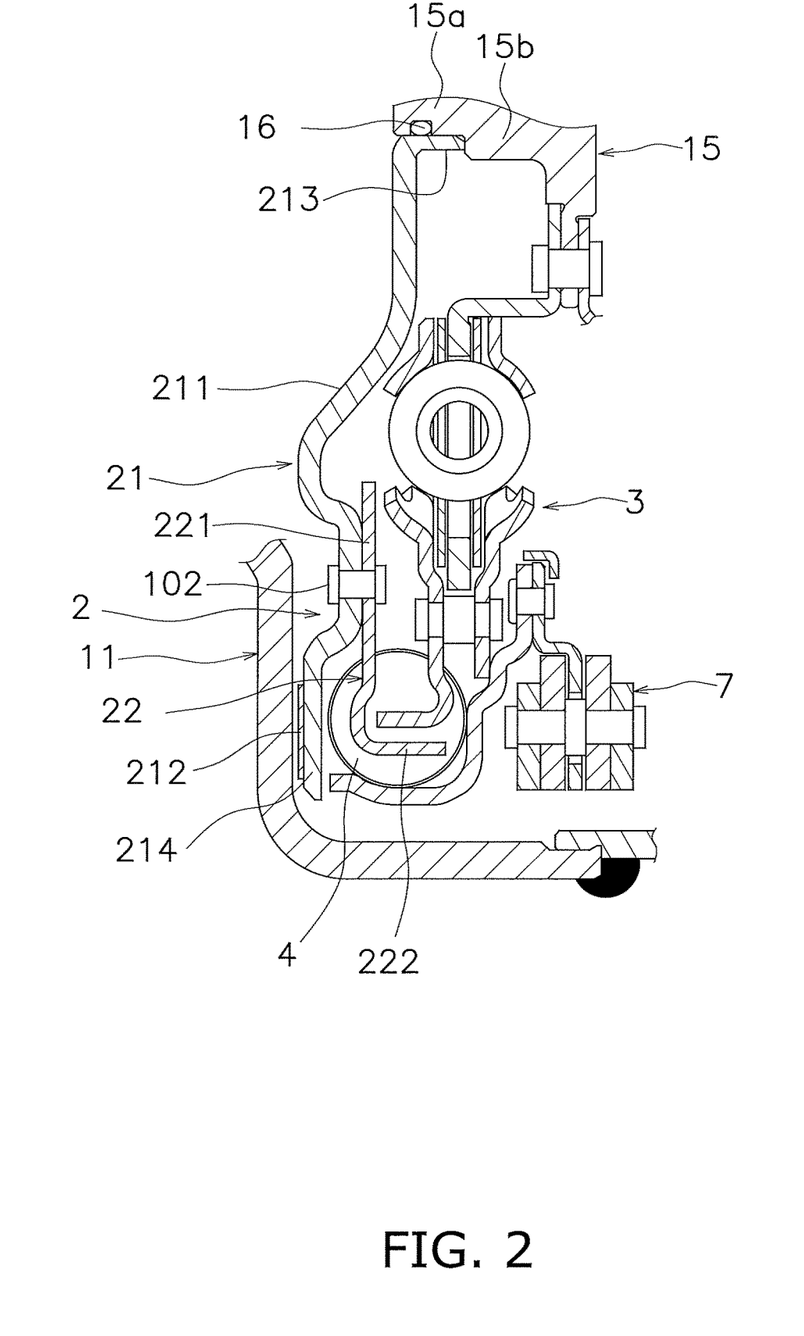
FIG. 2 is a cross-sectional side view of a lock-up device mainly focused on an input-side rotary member.

The input-side rotary member 2 is a member into which the power from the engine is inputted. As shown in FIG. 2, the input-side rotary member 2 includes a piston 21 and a drive plate 22. The piston 21 is a disc-shaped plate. The piston 21 is disposed on the transmission side (the right side in FIG. 1) of the front cover 11. The piston 21 is supported by the output hub 15 so as to be rotatable relatively thereto and be axially movable. When moved toward the front cover 11, the piston 21 is engaged by friction with the front cover 11 and is unitarily rotated therewith. Accordingly, the power from the engine is inputted into the input-side rotary member 2.

The piston 21 includes a disc part 211, a friction member 212 and a tubular part 213. The disc part 211 has a disc shape and includes an opening in the middle thereof. The disc part 211 includes a flat part 214 in the outer peripheral part thereof. The friction member 212 is fixed to the front cover 11-side surface of the flat part 214. The friction member 211 has an annular shape. When the friction member 212 is pressed onto the front cover 11, a torque is transmitted from the front cover 11 to the piston 21. In other words, the piston 21 composes a clutch part.

The tubular part 213 axially extends from the inner peripheral end of the disc part 211. The tubular part 213 is supported by the outer peripheral surface of the output hub 15 so as to be axially movable and be rotatable relatively thereto.

It should be noted that the outer peripheral surface of the output hub 15 includes a step part composed of a small diameter part 15a disposed on the engine and a large diameter part 15b disposed on the transmission side. The piston 21 is supported by the small diameter part 15a. A seal member 16 is attached to the small diameter part 15a. The seal member 16 seals between the inner peripheral surface of the piston 21 and the output hub 15. Additionally, the piston 21 is restricted from moving axially toward the transmission, while the tip of the tubular part 213 thereof makes contact with the lateral surface of the large diameter part 15b.

The drive plate 22 is a plate that is fixed to the piston 21 and is engaged with the respective outer peripheral side torsion springs 4. Detailedly, the drive plate 22 is fixed to the transmission-side surface of the outer peripheral part of the piston 21.

The drive plate 22 has a disc shape and is fixed at an inner peripheral part 221 thereof to the transmission-side surface of the piston 21 by a rivet(s) 102. The drive plate 22 includes a plurality of engaging parts 222. Specifically, the respective engaging parts 222 are formed by bending the outer peripheral part of the drive plate 22 toward the transmission. The respective engaging parts 222 are provided at intervals in the circumferential direction. The respective engaging parts 222 are engaged with both ends of the respective outer peripheral side torsion springs 4.

Figure 3:
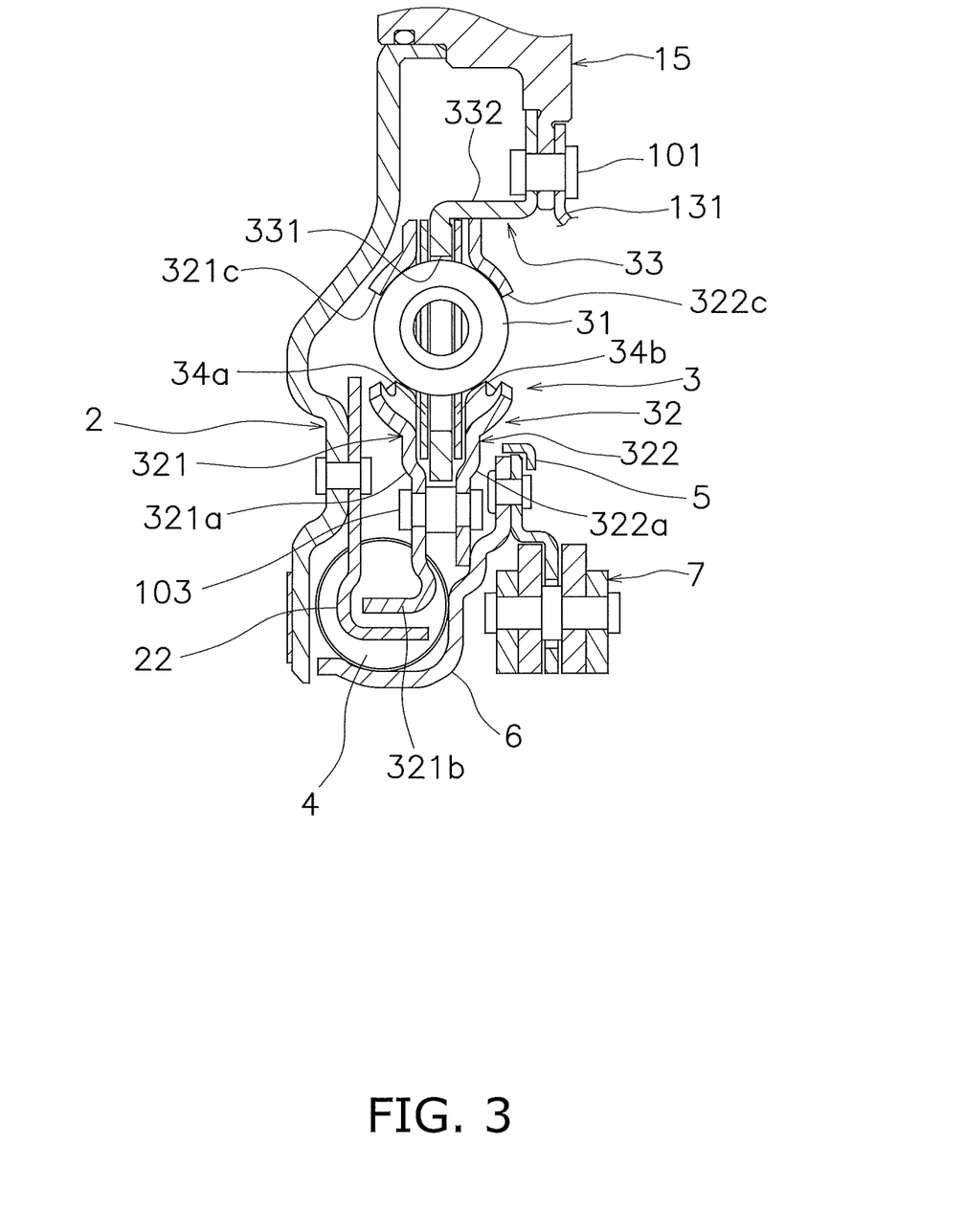
FIG. 3 is a cross-sectional side view of the lock-up device mainly focused on an output-side rotary member.

As shown in FIG. 3, the output-side rotary member 3 outputs a power to the transmission. Detailedly, the output-side rotary member 3 is attached to the output hub 15, and is unitarily rotated with the output hub 15. The output-side rotary member 3 includes a plurality of inner peripheral side torsion springs 31 (exemplary second elastic members), an intermediate member 32, an output plate 33, a first coupling plate 34a and a second coupling plate 34b.

Figure 4:
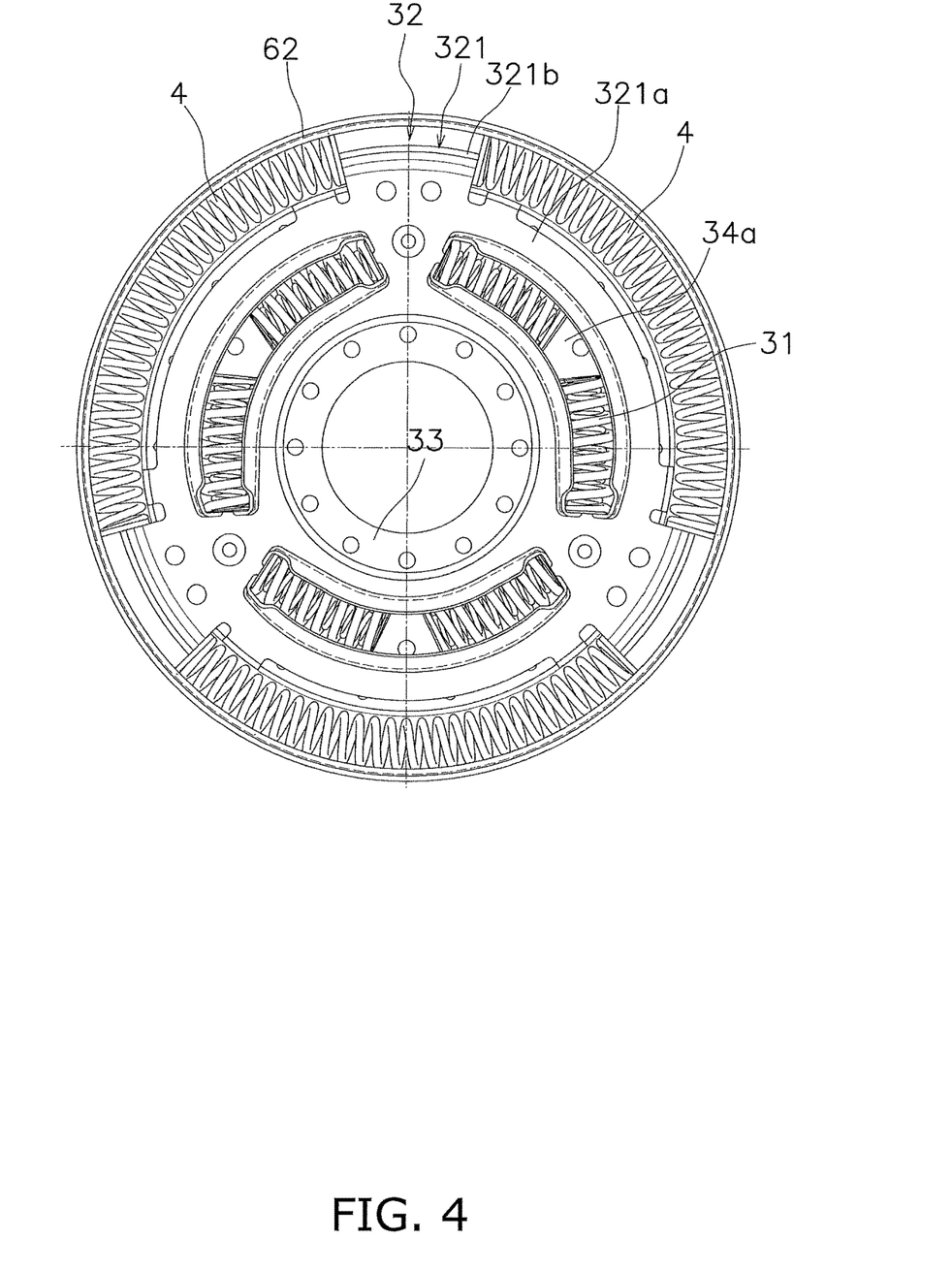
FIG. 4 is a front view of the lock-up device.

FIG. 4 is a front view of a lock-up device. It should be noted that the input-side rotary member 2 is not shown in FIG. 4. As shown in FIG. 4, the respective inner peripheral side torsion springs 31 are disposed radially inside the respective outer peripheral side torsion springs 4. Each inner peripheral side torsion spring 31 is a coil spring and is preferably an arc spring. In other words, each inner peripheral side torsion spring 31 has a circular-arc shape bulging to the outer peripheral side in a free state, in other words, in a stand-alone state before assemblage into the lock-up device 10.

As shown in FIGS. 3 and 4, the intermediate member 32 couples the respective outer peripheral side torsion springs 4 and the respective inner peripheral side torsion springs 31 in series. Additionally, the intermediate member 32 also has a function of holding the respective inner peripheral side torsion springs 31. The intermediate member 32 includes a first intermediate plate 321 and a second intermediate plate 322. The intermediate member 32 is rotatable relatively to the drive plate 22 and the output plate 33.

The first intermediate plate 321 couples the respective outer peripheral side torsion springs 4 and the respective inner peripheral side torsion springs 31 in series. The second intermediate plate 322 is unitarily rotated with the first intermediate plate 321. Detailedly, the second intermediate plate 322 is fixed to the first intermediate plate 321 by a rivet(s) 103.

The first and second intermediate plates 321 and 322 are annular disc-shaped members disposed between the piston 21 and the turbine shell 131. The first intermediate plate 321 and the second intermediate plate 322 are disposed at an interval in the axial direction. The first intermediate plate 321 is disposed on the engine side, whereas the second intermediate plate 322 is disposed on the transmission side.

The first intermediate plate 321 includes a body 321a having a disc shape and a plurality of lock parts 321b. The respective lock parts 321b are locked to the respective outer peripheral side torsion springs 4. The respective lock parts 321b extend toward the engine from the outer peripheral end of the body 321a in the axial direction. The respective lock parts 321b are disposed at intervals in the circumferential direction. One outer peripheral side torsion spring 4 is disposed between two lock parts 321b.

The second intermediate plate 322 includes a body 322a having a disc shape. The outer peripheral part of the body 322a makes contact with the float member 6 in the axial direction.

The first intermediate plate 321 includes window parts 321c axially penetrating therethrough, whereas the second intermediate plate 322 includes window parts 322c axially penetrating therethrough. Each of the window parts 321c and 322c has a circumferentially extending shape and includes cut-and-raised parts, which are axially cut and raised, on the inner peripheral part and outer peripheral part thereof. The inner peripheral side torsion springs 31 are disposed in pairs of window parts 321c and 322c of both plates 321 and 322. Additionally, each inner peripheral side torsion spring 31 is supported at both circumferential ends and both radial sides thereof by each pair of window parts 321c and 322c. Moreover, each inner peripheral side torsion spring 31 is restricted from radially and axially jumping out by the cut-and-raised parts of each pair of window parts 321c and 322c.

As shown in FIG. 3, the output plate 33 outputs a power from each inner peripheral side torsion spring 31. The output plate 33 is an annular disc-shaped member and is fixed at the inner peripheral part thereof together with the turbine shell 131 to the output hub 15 by the rivets 101.

The output plate 33 is disposed between the first intermediate plate 321 and the second intermediate plate 322. The output plate 33 is rotatable relatively to the first and second intermediate plates 321 and 322. The output plate 33 includes window holes 331 in correspondence with the pairs of window parts 321c and 322c of the first and second intermediate plates 321 and 322. The window holes 331 are axially penetrating holes in which the inner peripheral side torsion springs 31 are disposed.

The output plate 33 includes a tubular part 332, axially extending, in the radially intermediate part thereof. The inner peripheral surface of the second intermediate plate 322 makes contact with the outer peripheral surface of the tubular part 332.

The first and second coupling plates 34a and 34b couple at least two inner peripheral side torsion springs 31 in series. The first and second coupling plates 34a and 34b are annular disc-shaped plates.

The first and second coupling plates 34a and 34b include a plurality of accommodation holes extending in the circumferential direction. The inner peripheral side torsion springs 31 are accommodated in the respective accommodation holes.

The first coupling plate 34a is disposed between the first intermediate plate 321 and the output plate 33. The second coupling plate 34b is disposed between the second intermediate plate 322 and the output plate 33. The first and second coupling plates 34a and 34b are rotatable relatively to the first intermediate plate 321, the second intermediate plate 322 and the output plate 33. The first coupling plate 34a and the second coupling plate 34b are coupled to each other, but alternatively, may not be coupled to each other.

The outer peripheral side torsion springs 4 couple the input-side rotary member 2 and the output-side rotary member 3 such that the input-side rotary member 2 and the output-side rotary member 3 are rotatable relatively to each other. Specifically, the outer peripheral side torsion springs 4 couple the drive plate 22 and the first intermediate plate 321 such that the drive plate 22 and the first intermediate plate 321 are rotatable relatively to each other.

As shown in FIG. 4, the outer peripheral side torsion springs 4 are coil springs, and preferably are arc springs. In other words, each outer peripheral side torsion spring 4 has a circular-arc shape bulging to the outer peripheral side in a free state, in other words, in a stand-alone state before assemblage into the lock-up device 10.

Figure 5:
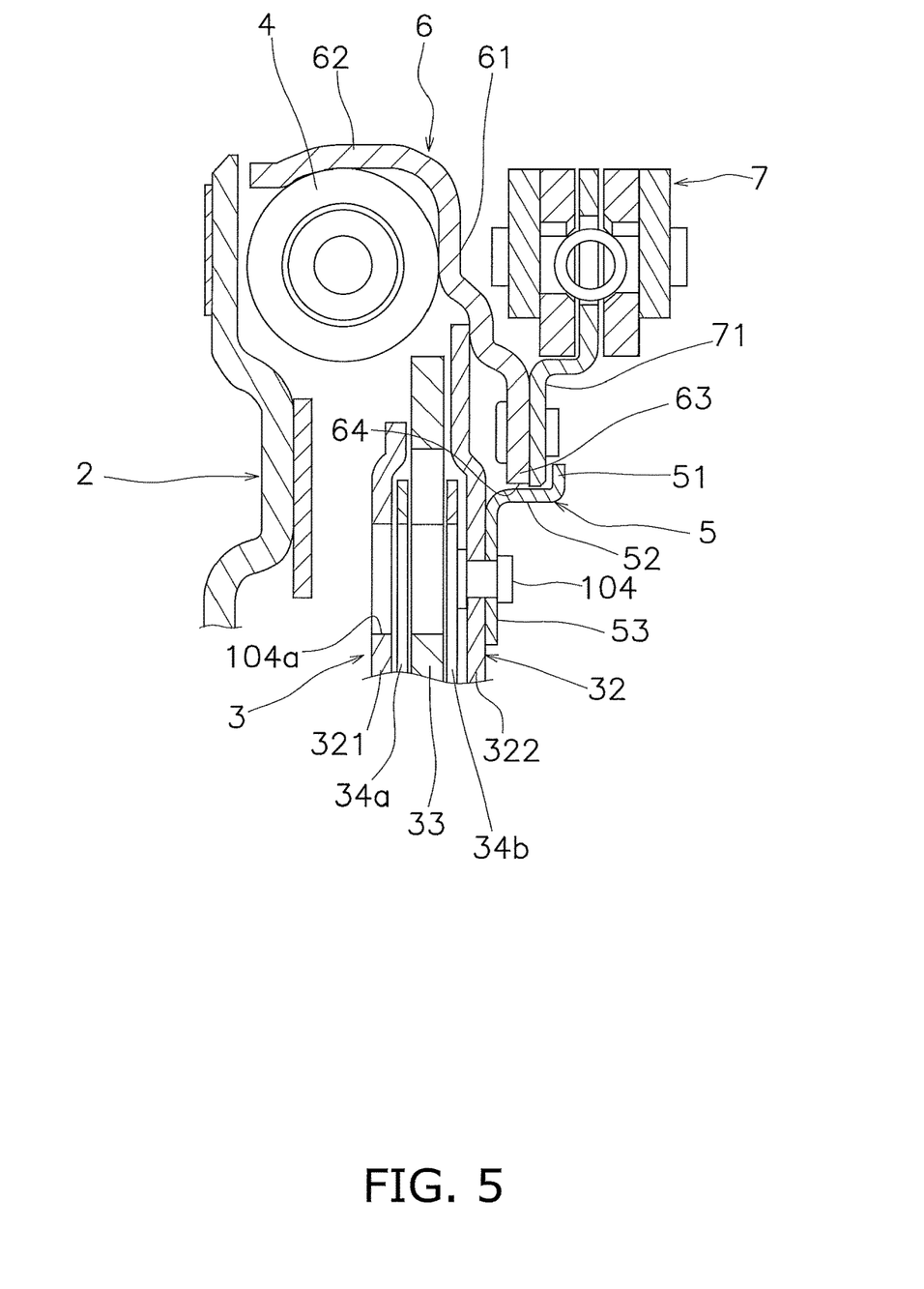
FIG. 5 is a cross-sectional side view of the lock-up device mainly focused on a restriction member.

As shown in FIG. 5, the restriction member 5 is a member that restricts axial movement of the float member 6. The restriction member 5 is attached to the output-side rotary member 3. Specifically, the restriction member 5 is attached to the intermediate member 32. More specifically, the restriction member 5 is attached to the second intermediate plate 322. The restriction member 5 is attached to the output-side rotary member 3 by, for instance, a rivet(s) 104.

The restriction member 5 includes a first restriction part 51, a second restriction part 52 and an attachment part 53. It should be noted that the restriction member 5 is made of a single annular disc-shaped plate.

The first restriction part 51 is disposed at an interval from the output-side rotary member 3 in the axial direction. Detailedly, the first restriction part 51 is disposed between the output-side rotary member 3 and the turbine shell 131. The first restriction part 51 extends in the radial direction. Detailedly, the first restriction part 51 extends radially outside from the second restriction part 52.

The second restriction part 52 extends from the first restriction part 51 toward the output-side rotary member 3. Detailedly, the second restriction part 52 has a tubular shape. The second restriction part 52 extends toward the output-side rotary member 3 from the inner peripheral end of the first restriction part 51 in the axial direction.

The attachment part 53 extends radially inside from the second restriction part 52. The attachment part 53 is attached to the output-side rotary member 3. Detailedly, the attachment part 53 is attached to the second intermediate plate 322 by the rivet(s) 104. It should be noted that each of the first intermediate plate 321 and the output plate 33 includes a through hole(s) 104a in a part thereof axially opposed to the rivet(s) 104. Therefore, the rivet(s) 104 can be swaged through the through hole(s) 104a, respectively.

Thus, the restriction member 5 is attached to the output-side rotary member 3. Therefore, the inertia force of the output-side rotary member 3 increases by the amount of the restriction member 5, and the rotational fluctuation value of the output-side rotary member 3 can be reduced. As a result, the lock-up device 10 is enhanced in vibration attenuation performance.

The float member 6 is rotatable relatively to the input-side rotary member 2 and the output-side rotary member 3. The inner peripheral end of the float member 6 is disposed axially between the output-side rotary member 3 and the first restriction part 51. Detailedly, the inner peripheral end 63 of the float member 6 is disposed between the second intermediate plate 322 and the first restriction part 51.

The float member 6 includes a disc part 61 and a support part 62. The disc part 61 has an annular disc shape. The inner peripheral end 63 of the disc part 61 is disposed axially between the output-side rotary member 3 and the first restriction part 51. In other words, the float member 6 is restricted from moving axially toward the transmission by the first restriction part 51. For example, the disc part 61 of the float member 6 is restricted from moving toward the transmission by indirectly making contact with the first restriction part 51 through another member such as a base plate 71 of the dynamic damper device 7 to be described. It should be noted that the disc part 61 may be restricted from moving toward the transmission by directly making contact with the first restriction part 51.

Additionally, the disc part 61 axially makes contact with the output-side rotary member 3. Detailedly, the disc part 61 directly makes contact with the second intermediate plate 322. In other words, the float member 6 is restricted from moving axially toward the engine by the output-side rotary member 3. It should be noted that the disc part 61 may indirectly make contact with the output-side rotary member 3 through another member.

An inner peripheral surface 64 of the disc part 61 is opposed to the second restriction part 52. Detailedly, the inner peripheral surface 64 of the disc part 61 makes contact with the outer peripheral surface of the second restriction part 52. In other words, the float member 6 is radially supported by the second restriction part 52.

As shown in FIGS. 4 and 5, the support part 62 is disposed radially outside the respective outer peripheral side torsion springs 4. The support part 62 has a cylindrical shape and extends toward the engine from the outer peripheral end of the disc part 61 in the axial direction. The respective outer peripheral side torsion springs 4 are restricted from moving radially outside by the support part 62. It should be noted that the float member 6 does not make contact with the circumferential ends of each outer peripheral side torsion spring 4.

The float member 6 makes contact with the respective outer peripheral side torsion springs 4. Therefore, when the lock-up device 10 is rotated, the float member 6 slides against the respective outer peripheral side torsion springs 4.

Figure 6:
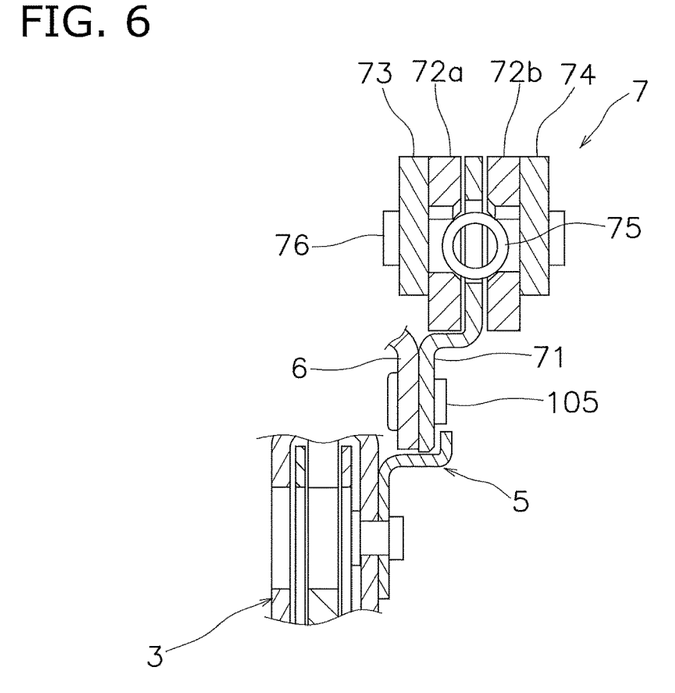
FIG. 6 is a cross-sectional side view of the lock-up device mainly focused on a dynamic damper device.

As shown in FIG. 6, the dynamic damper device 7 is attached to the float member 6. The dynamic damper device 7 includes the base plate 71, a first inertia member 72a, a second inertia member 72b, a first lid member 73, a second lid member 74, a plurality of coil springs 75 and a stop pin(s) 76.

The base plate 71 has an annular shape. The base plate 71 is attached to the float member 6. Detailedly, the inner peripheral end of the base plate 71 is fixed to that of the float member 6 by a plurality of rivets 105.

Figure 7:
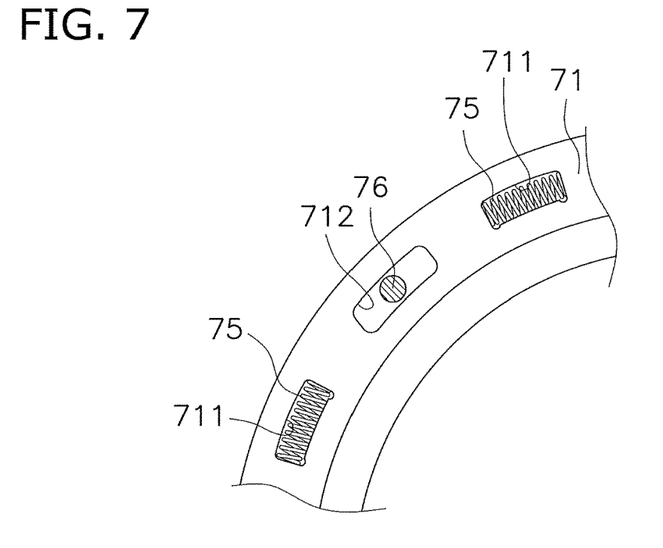
FIG. 7 is a front view of a base plate.

As shown in FIG. 7, the base plate 71 includes a plurality of accommodation parts 711. The respective accommodation parts 711 are disposed at intervals in the circumferential direction. The respective accommodation parts 711 extend in the circumferential direction. A plurality of elongated holes 712 are provided, each being disposed between the accommodation parts 711. The elongated holes 712 extend in the circumferential direction, and are disposed on the circumference of an imaginary circle on which the accommodation parts 711 are disposed.

As shown in FIG. 6, the first and second inertia members 72a and 72b are rotatable relatively to the float member 6. The first and second inertia members 72a and 72b are formed by stamping of sheet metal members. The first and second inertia members 72a and 72b are disposed on both axial sides of the base plate 71. In other words, the first inertia member 72a is disposed on the engine side of the base plate 71, whereas the second inertia member 72b is disposed on the transmission side of the base plate 71.

Figure 8:
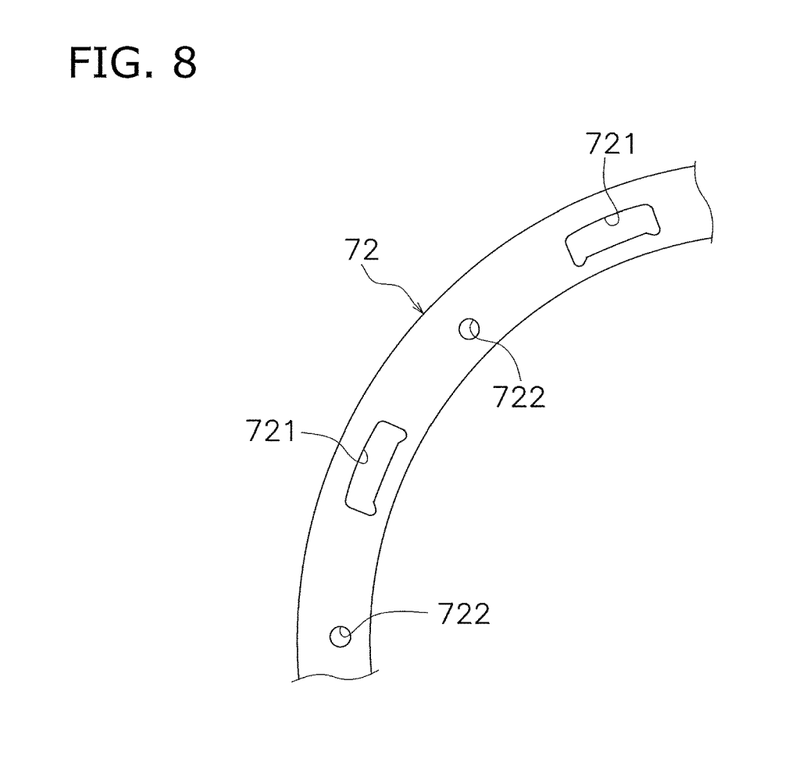
FIG. 8 is a front view of an inertia member.

As shown in FIG. 8, each of the first and second inertia members 72a and 72b includes a plurality of accommodation parts 721. The respective accommodation parts 721 are disposed at intervals in the circumferential direction. The respective accommodation parts 721 are disposed in corresponding positions to the respective accommodation parts 711 of the base plate 71. Additionally, each of the first and second inertia members 72a and 72b includes a plurality of through holes 722, each of which is disposed in a corresponding position to the circumferential middle of each elongated hole 712 of the base plate 71.

As shown in FIG. 6, the first lid member 73 has an annular shape and is disposed on the engine side of the first inertia member 72a. In other words, the first inertia member 72a is interposed and held between the first lid member 73 and the base plate 71. As shown close-up in FIG. 9, the first lid member 73 includes a plurality of through holes 731 in corresponding positions to the through holes 722 of the first inertia member 72a.

Figure 9:
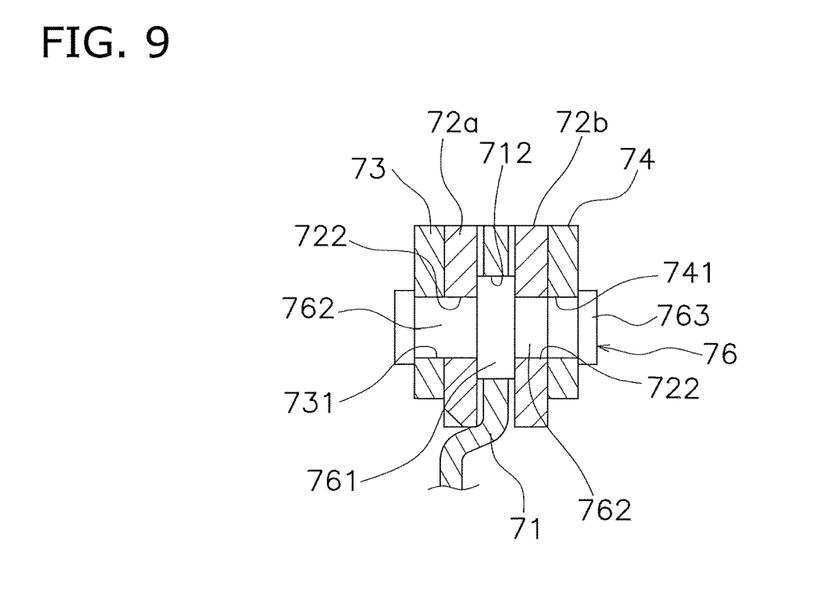
FIG. 9 is a cross-sectional side view of the dynamic damper device.

The second lid member 74 is disposed on the transmission side of the second inertia member 72b. In other words, the second inertia member 72b is interposed and held between the second lid member 74 and the base plate 71. The second lid member 74 is an annular member. The second lid member 74 includes a plurality of through holes 741 in corresponding positions to the through holes 722 of the second inertia member 72b.

As shown in FIGS. 6 to 8, each of the plural coil springs 75 is accommodated in each accommodation part 711 of the base plate 71 and each accommodation part 721 of each inertia member 72. Additionally, both ends of each coil spring 75 make contact with the circumferential ends of each accommodation part 711 of the base plate 71 and those of each accommodation part 721 of each inertia member 72.

As shown in FIG. 9, the stop pin 76 includes a large diameter trunk 761 in the axial middle part thereof and includes small diameter trunks 762 on both sides of the large diameter trunk 761.

The diameter of the large diameter trunk 761 is larger than that of each through hole 722 of each inertia member 72 and is smaller than that (radial dimension) of each elongated hole 712 of the base plate 71. Additionally, the thickness of the large diameter trunk 761 is slightly thicker than that of the base plate 71.

The small diameter trunks 762 are inserted through the through holes 722 of the inertia members 72 and the through holes 731 and 741 of both lid members 73 and 74. Additionally, the inertia members 72 and both lid members 73 and 74 are fixed to both axial sides of the base plate 71 by swaging the heads of the small diameter trunks 762.

With the configuration described above, the base plate 71 is rotatable relatively to the first and second inertia members 72a and 72b and the two lid members 73 and 74 in a range that the stop pin 76 is movable in the elongated hole 712 of the base plate 71. Additionally, relative rotation of both is prevented when the large diameter trunk 761 of the stop pin 76 makes contact with one end of the elongated hole 712.

Next, the action of the torque converter 100 will be briefly explained. When the front cover 11 and the impeller 12 are rotated, hydraulic oil flows from the impeller 12 to the turbine 13, and a torque is transmitted from the impeller 12 to the turbine 13 through the hydraulic oil. The torque transmitted to the turbine 13 is transmitted to an input shaft of the transmission (not shown in the drawings) through the output hub 15.

When the speed ratio of the torque converter 100 increases and the rotational velocity of the input shaft reaches a predetermined value, the hydraulic oil between the front cover 11 and the piston 21 is drained, whereas the hydraulic oil is supplied to the turbine 13 side of the piston 21. Accordingly, the piston 21 is moved toward the front cover 11. As a result, the friction member 212 fixed to the piston 21 is pressed onto the front cover 11, and the lock-up device 10 is turned on.

In a clutch-on state described above, the torque is transmitted through a path of "the front cover 11→the piston 21→the drive plate 22→the outer peripheral side torsion springs 4→the intermediate member 32→the inner peripheral side torsion springs 31→the output plate 33" and is then outputted to the transmission side through the output hub 15.

In the lock-up device 10, the torque is transmitted and fluctuations in velocity of rotation to be inputted from the front cover 11 are absorbed and attenuated. Specifically, when torsional vibration occurs in the lock-up device 10, the outer peripheral side torsion springs 4 and the inner peripheral side torsion springs 31 are compressed in series between the drive plate 22 and the output plate 33. Fluctuations in rotational velocity are attenuated by actuation of these torsion springs 4 and 31 and friction resistance (hysteresis torque) of respective constituent elements.

Actions of Dynamic Damper Device 7

When compressed, each outer peripheral side torsion spring 4 deforms such that the circumferential middle part thereof bulges radially outward. Additionally, each outer peripheral side torsion spring 4 tends to be moved radially outward by a centrifugal force.

In the condition described above, the outer peripheral part of each outer peripheral side torsion spring 4 and the inner peripheral surface of the support part 62 of the float member 6 slide against each other, and friction resistance is generated between both. Therefore, the float member 6 is configured to be rotated together with each outer peripheral side torsion spring 4 in the same direction as the rotational direction of each outer peripheral side torsion spring 4 by a rotational angle that is approximately half the torsion angle of each outer peripheral side torsion spring 4.

On the other hand, the dynamic damper device 7 is attached to the float member 6. Hence, inertia elements including the respective inertia members 72a and 72b and the respective lid members 73 and 74 are configured to act oppositely to a direction of vibration caused by fluctuations in rotational velocity. Accordingly, fluctuations in velocity of rotation from the float member 6 to each outer peripheral side torsion spring 4 are directly attenuated. Simultaneously, fluctuations in velocity of rotation to be transmitted to the transmission side are also directly attenuated through the output-side rotary member 3 by a friction force to be generated on the restriction member 5.

Figure 10:
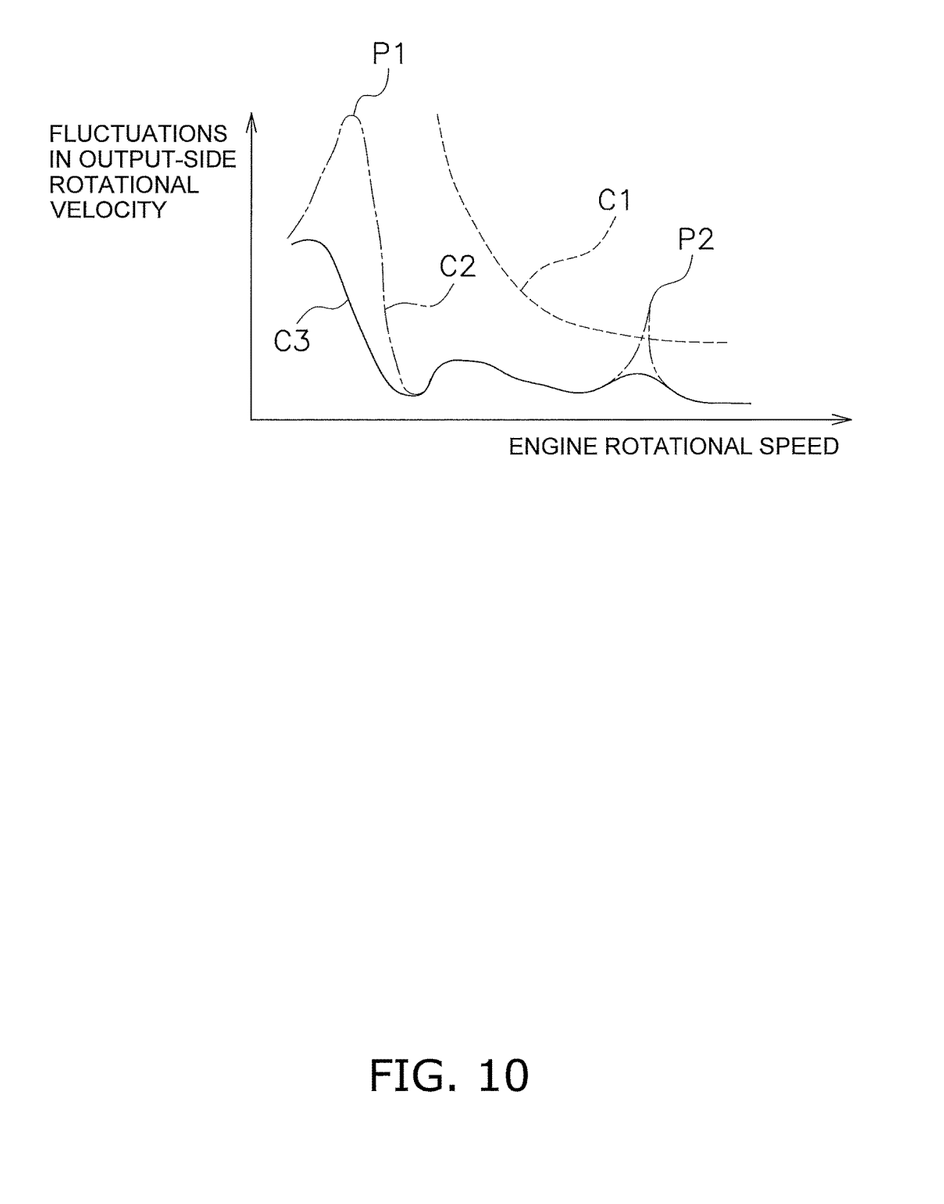
FIG. 10 is a characteristic diagram of engine rotational speed and fluctuations in rotational velocity of the output-side rotary member.

FIG. 10 shows advantageous effects by the aforementioned dynamic damper device 7 in comparison with a well-known device. In FIG. 10, the horizontal axis indicates engine rotation, whereas the vertical axis indicates fluctuations in output-side rotational velocity. Additionally, characteristic C1 indicates a characteristic of a lock-up device without a dynamic damper device; characteristic C2 indicates a characteristic of a lock-up device with a dynamic damper device attached to an intermediate member thereof; and characteristic C3 indicates a characteristic of the lock-up device according to the present exemplary embodiment.

As is obvious from FIG. 10, in the present exemplary embodiment, peak P1 of fluctuations in the well-known device can be greatly inhibited especially in a low rotational speed range. Additionally, peak P2 of fluctuations in the well-known device can be inhibited similarly in a high rotational speed range. This is because the float member 6 is not engaged with the outer peripheral side torsion springs 4 while being rotatable relatively to another member, and vibration of the float member 6 is excluded from a vibration system.

Modifications

One exemplary embodiment of the present disclosure has been described above. However, the present disclosure is not limited to the aforementioned exemplary embodiment, and a variety of changes can be made without departing from the scope of the present disclosure.

Modification 1

Figure 11:
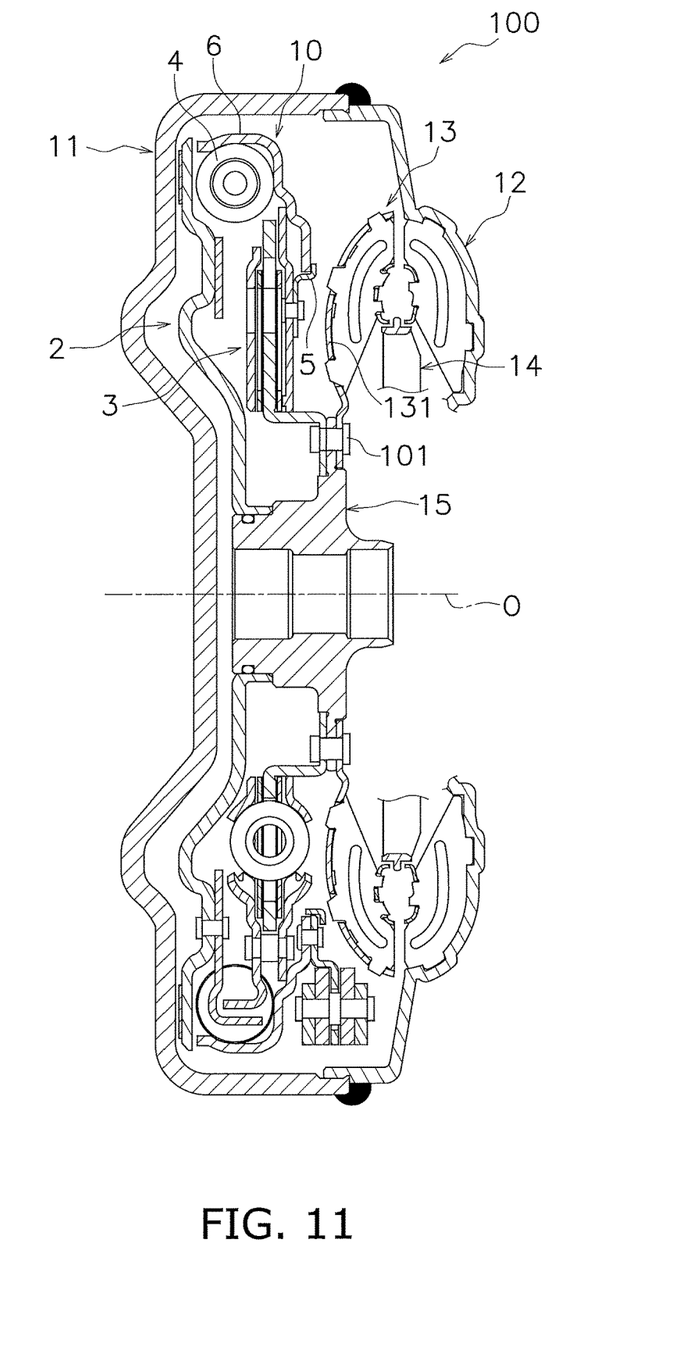
FIG. 11 is a cross-sectional side view of a torque converter according to modification 1.

For example, the lock-up device according to the present exemplary embodiment includes the dynamic damper device. However, the configuration of the lock-up device is not limited to this. For example, as shown in FIG. 11, the lock-up device may not include any dynamic damper device.

Modification 2

In the aforementioned exemplary embodiment, the input-side rotary member 2 includes two members composed of the piston 21 and the drive plate 22, but may include only one member. Specifically, the outer peripheral part of the piston 21 may be bent toward the transmission and may be engaged with the outer peripheral side torsion springs 4.

Modification 3

Figure 12:
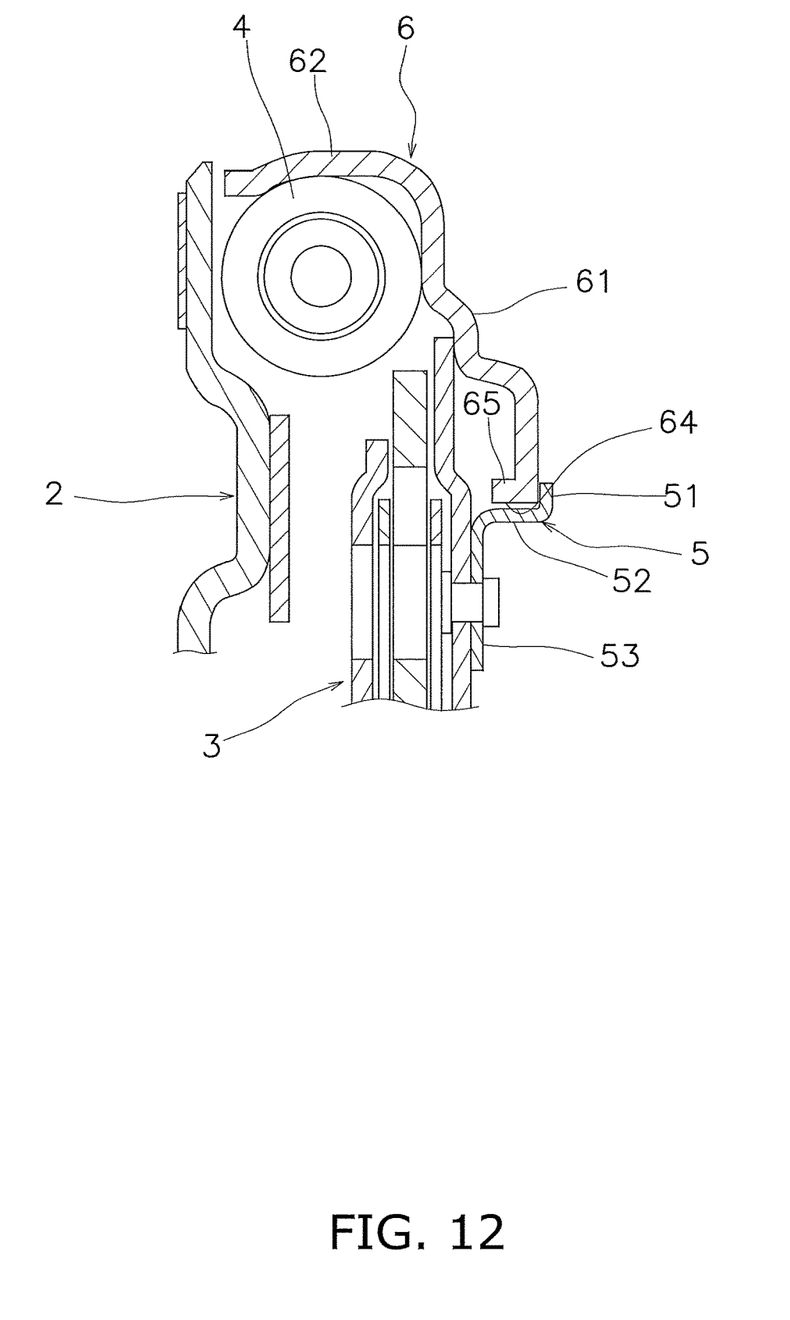
FIG. 12 is a cross-sectional side view of a lock-up device according to modification 3.

As shown in FIG. 12, the float member 6 may include the disc part 61 having an opening in the middle thereof and a tubular part 65 axially extending from the inner peripheral end of the disc part 61. The inner peripheral surface 64 of the tubular part 65 makes contact with the outer peripheral surface of the second restriction part 52. It should be noted that the tubular part 65 may extend axially toward the engine, or alternatively may extend axially toward the transmission.

Modification 4

Figure 13:
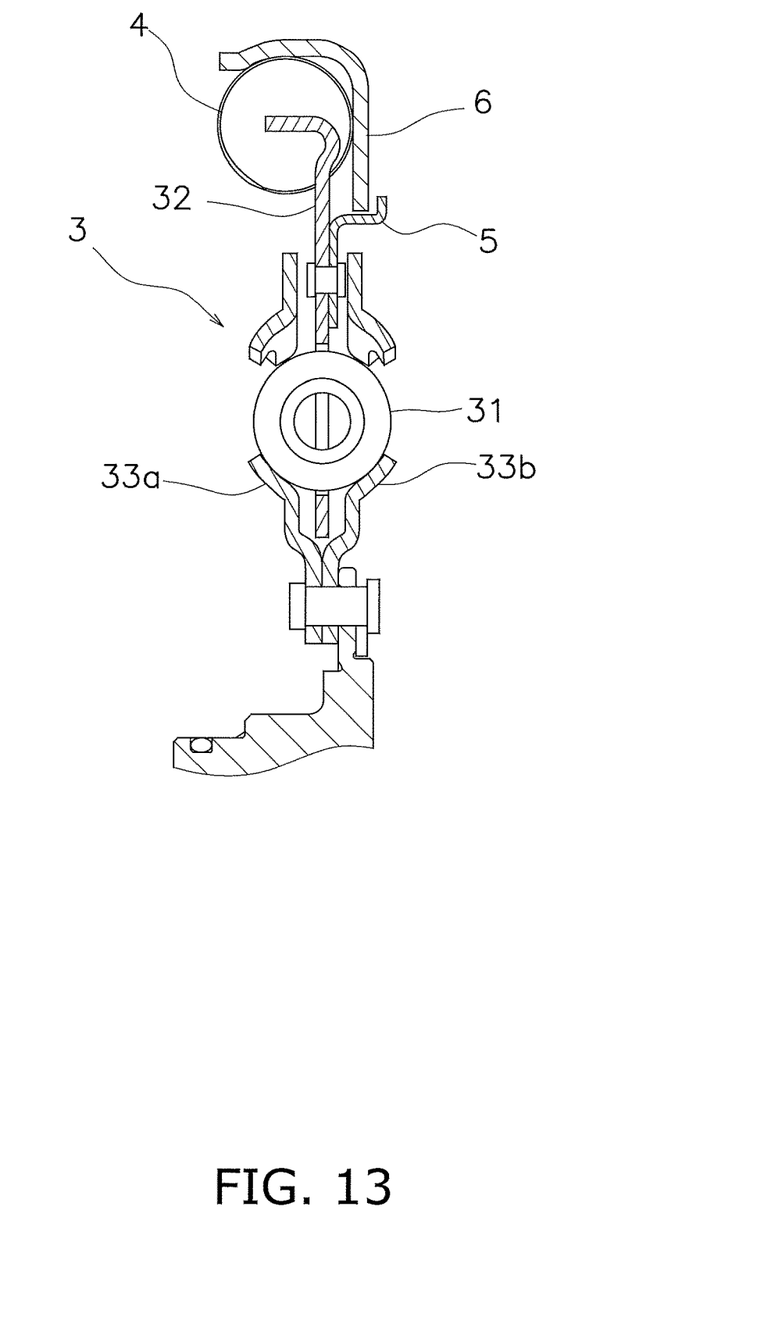
FIG. 13 is a cross-sectional side view of a lock-up device according to modification 4.

The output-side rotary member 3 according to the aforementioned exemplary embodiment includes two intermediate plates and one output plate 33. However, the configuration of the output-side rotary member 3 is not particularly limited to this. For example, as shown in FIG. 13, the output-side rotary member 3 may include one intermediate plate 32 and two output plates 33*a* and 33*b*. The intermediate plate 32 is disposed between the two output plates 33*a* and 33*b*. The restriction member 5 is attached to the intermediate plate 32.

REFERENCE SIGNS LIST

2 Input-side rotary member
3 Output-side rotary member
4 Outer peripheral side torsion spring
5 Restriction member
51 First restriction part
6 Float member
7 Dynamic damper device
10 Lock-up device

The invention claimed is:

1. A power transmission device for transmitting a power from an engine to a transmission, the power transmission device comprising:
   an input-side rotary member into which the power from the engine is inputted;
   an output-side rotary member for outputting the power to the transmission;
   a first elastic member coupling the input-side rotary member and the output-side rotary member such that the input-side rotary member and the output-side rotary member are rotatable relative to each other;
   a restriction member attached to the output-side rotary member, the restriction member including a first restriction part, the first restriction part disposed at an interval from the output-side rotary member in an axial direction; and
   a float member rotatable relative to the input-side rotary member and the output-side rotary member, an inner peripheral end of the float member disposed between the output-side rotary member and the first restriction part in the axial direction,
   wherein the float member does not contact circumferential ends of the first elastic member.

2. The power transmission device according to claim 1, wherein the float member includes a support part disposed radially outside the first elastic member.

3. The power transmission device according to claim 1, wherein
   the restriction member further includes a second restriction part extending from the first restriction part toward the output-side rotary member, and an inner peripheral surface of the float member is opposed to the second restriction part.

4. The power transmission device according to claim 3, wherein
   the float member includes a disc part and a tubular part, the disc part including an opening in a middle thereof, the tubular part extending from an inner peripheral end of the disc part in the axial direction, and
   an inner peripheral surface of the tubular part makes contact with an outer peripheral surface of the second restriction part.

5. The power transmission device according to claim 3, wherein
   the restriction member further includes an attachment part, the attachment part disposed radially inside with respect to the second restriction part, the attachment part attached to the output-side rotary member, and the first restriction part is disposed radially outside with respect to the second restriction part.

6. The power transmission device according to claim 1, wherein the float member makes contact with the output-side rotary member in the axial direction.

7. The power transmission device according to claim 1, wherein the first elastic member is a coil spring.

8. The power transmission device according to claim 1, wherein the first elastic member is an arc spring.

9. The power transmission device according to claim 1, wherein the output-side rotary member includes a second elastic member and an intermediate member, the second elastic member disposed radially inside the first elastic member, the intermediate member coupling the first elastic member and the second elastic member in series.

10. The power transmission device according to claim 9, wherein the restriction member is attached to the intermediate member.

11. The power transmission device according to claim 9, wherein the intermediate member includes a first intermediate plate and a second intermediate plate, the first intermediate plate coupling the first elastic member and the second elastic member in series, the second intermediate plate unitarily rotated with the first intermediate plate, and the output-side rotary member further includes an output plate, the output plate disposed between the first intermediate plate and the second intermediate plate, the output plate for outputting a power from the second elastic member.

12. The power transmission device according to claim 11, wherein the restriction member is fixed to one of the first intermediate plate and the second intermediate plate by a rivet, and each of the output plate and the other of the first intermediate plate and the second intermediate plate includes a through hole in a part thereof opposed to the rivet in the axial direction.

13. The power transmission device according to claim 11, wherein the second elastic member is one of a plurality of second elastic members installed, the output-side rotary member further includes a coupling plate coupling at least two of the plurality of second elastic members in series, and the coupling plate is disposed at least either between the first intermediate plate and the output plate or between the second intermediate plate and the output plate.

14. The power transmission device according to claim 1, further comprising:

a dynamic damper device directly attached to the float member, the dynamic damper device including an inertia member, the inertia member rotatable relative to the float member.

\* \* \* \* \*